United States Patent [19]
Talbot et al.

[11] Patent Number: 5,935,194
[45] Date of Patent: Aug. 10, 1999

[54] METHOD FOR USING EXTERNAL CONSTRAINTS TO IMPROVE THE SPEED AND RELIABILITY OF PHASE AMBIGUITY RESOLUTION IN REAL-TIME KINEMATIC INITIALIZATION

[75] Inventors: Nicholas C. Talbot, Ashburton, Australia; Michael T. Allison, Santa Clara; Mark E. Nichols, Sunnyvale, both of Calif.

[73] Assignee: Trimble Navigation Limited, Sunnyvale, Calif.

[21] Appl. No.: 08/779,475

[22] Filed: Jan. 7, 1997

Related U.S. Application Data

[63] Continuation-in-part of application No. 08/644,422, May 10, 1996, Pat. No. 5,602,741, which is a continuation of application No. 08/199,387, Feb. 18, 1994, Pat. No. 5,519,620.

[51] Int. Cl.[6] ............................. G01S 3/02; G01S 5/02; G06F 165/00
[52] U.S. Cl. ......................... 701/214; 342/357; 342/457
[58] Field of Search ................................. 701/213, 214; 342/357, 457

[56] References Cited

U.S. PATENT DOCUMENTS

| | | | |
|---|---|---|---|
| 4,677,555 | 6/1987 | Goyet | 364/424 |
| 4,700,301 | 10/1987 | Dyke | 364/424 |
| 4,807,131 | 2/1989 | Clegg | 364/424.01 |
| 5,144,317 | 9/1992 | Duddek et al. | 342/357 |
| 5,148,179 | 9/1992 | Allison | 342/457 |
| 5,359,332 | 10/1994 | Allison et al. | 342/357 |
| 5,442,363 | 8/1995 | Remondi | 342/357 |

OTHER PUBLICATIONS

"Recent Advances in GPS Hardware & Software", Timble Navigation. Jun. 25–26, 1992.
B. Remondi, "'On–The–Fly' Kinematic GPS Results Using Full–wavelength Dual–Frequency Carrier Ranges". no date.

*Primary Examiner*—Michael J. Zanelli
*Attorney, Agent, or Firm*—Thomas E. Schatzel; Law Offices of Thomas E. Schatzel, a Prof. Corp.

[57] ABSTRACT

A method for obtaining integer ambiguity solutions based on externally provided constraints, e.g., altitude. Such constraints are useful in reducing the computational burden created by the search problem, and using constraints is particularly more effective when a more limited number of satellite vehicles are visible than is ordinarily the case. The constraints are exercised in a search algorithm. As the branches of the integer ambiguity search tree are traversed, an additional test is used to determine if the current search candidate is compatible with such external constraint. Because a three-dimensional position is associated with each search candidate, the branch clipping is straightforward. The ambiguity candidates are each only acceptable if their locations in space are within a confidence region bound set determined from the external constraint. Any sensor that can provide any combination of x, y, or z position information that is better than that obtainable from GPS code phase is a candidate source of such external constraints.

11 Claims, 5 Drawing Sheets

METHOD FOR USING EXTERNAL CONSTRAINTS TO IMPROVE THE SPEED AND RELIABILITY OF PHASE AMBIGUITY RESOLUTION IN REAL-TIME KINEMATIC INITIALIZATION

RELATED APPLICATIONS

This application is a continuation-in-part of U.S. patent application Ser. No. 08/644,422, filed May 10, 1996, now U.S. Pat. No. 5,602,741, by Nicholas Charles TALBOT, et al., which was, in turn, a continuation of U.S. patent application Ser. No. 08/199,387, filed Feb. 18, 1994 now U.S. Pat. No. 5,519,620, by Nicholas Charles TALBOT, et al., and such are incorporated herein by reference. A related U.S. Pat. No. 5,471,218, issued to one of the present inventors, Nicholas C. Talbot, on Nov. 28, 1995, and is incorporated herein by reference.

BACKGROUND OF THE INVENTION

1. Field of the Invention

The invention relates generally to navigation systems and industrial control systems and more specifically to combinations of navigation and industrial controls that provide centimeter accuracy in the positioning and movement of operating machinery and robots.

2. Description of the Prior Art

When originally conceived, the global positioning system (GPS) that was made operational by the United States Government was not foreseen as being able to provide centimeter-level position accuracies. Such accuracies are now commonplace.

Extremely accurate GPS receivers depend on phase measurements of the radio carriers that they receive from various orbiting GPS satellites. Less accurate GPS receivers simply develop the pseudoranges to each visible satellite based on the time codes being sent. Within the granularity of a single time code, the carrier phase can be measured and used to compute range distance as a multiple of the fundamental carrier wavelength. GPS signal transmissions are on two synchronous, but separate, carrier frequencies "L1" and "L2", with wavelengths of nineteen and twenty-four centimeters, respectively. Thus within nineteen or twenty-four centimeters, the phase of the GPS carrier signal will change 360°.

However, the number of whole cycle (360°) carrier phase shifts between a particular GPS satellite and the GPS receiver must be resolved. At the receiver, every cycle will appear the same. Therefore there is an "integer ambiguity". The computational resolution of the integer ambiguity has traditionally been an intensive arithmetic problem for the computers used to implement GPS receivers. The traditional approaches to such integer ambiguity resolution have prevented on-the-fly solution measurement updates for moving GPS receivers with centimeter accurate outputs. Very often, such highly accurate GPS receivers have required long periods of motionlessness to produce a first and subsequent position fix.

A prior art method for precision attitude determination and kinematic positioning is described by Hatch, in U.S. Pat. No. 4,963,889, comprises the steps of determining the approximate initial relative position of a secondary antenna that is freely movable with respect to a reference antenna; making carrier phase measurements based on the reception of "N" number of satellites, where N is the minimum number of satellites needed to compute the relative position of the secondary antenna; deriving from the carrier phase measurements an initial set of potential solutions for the relative position, wherein the initial set of potential solutions all fall within a region of uncertainty defined by a sphere having a radius equal to the maximum distance between the two antennas, and wherein multiple potential solutions arise because of whole-cycle ambiguity of the carrier signal; making redundant carrier phase measurements based on the reception of a carrier signal from an additional satellite (N+1); and eliminating false solutions from the initial set of potential solutions, based on a comparison of the redundant carrier phase measurements with the initial set of potential solutions, to reduce the number of potential solutions to close to one, whereby the number of potential solutions is not increased by use of the redundant carrier phase measurements.

"Deriving from the carrier phase measurements an initial set of potential solutions" means that the initial set is derived from just two satellites. The rest of the Hatch specification explains why N is exactly two in the case of attitude determination. Planar intersections of wave fronts are formed from the two satellites, thus obtaining a collection of parallel lines. The intersection points of these lines and a baseline sphere are determined, producing the initial set of potential solutions. For example, as explained at column 12, line 35 of Hatch, there are 188 points or potential solutions in the initial set. In the Hatch method, "eliminating false solutions from the initial set of potential solutions," means eliminating 187 of those 188 points. The idea of potential solutions refers to the initial set of 188 points.

Hatch forms an initial collection of around 188 potential solutions using just two satellites, and then uses phase measurements of the remaining satellites to whittle away at that the small initial collection, leaving only one candidate solution if phase measurements are accurate enough. Hatch avoids having to deal with large numbers of integer combinations.

Donald Knight, in U.S. Pat. No. 5,296,861, titled "METHOD AND APPARATUS FOR MAXIMUM LIKELIHOOD ESTIMATION DIRECT INTEGER SEARCH IN DIFFERENTIAL CARRIER PHASE ATTITUDE DETERMINATION SYSTEMS", and incorporated herein by reference, describes a method of reducing the mathematical intensity of integer ambiguity resolution.

Aside from making carrier phase measurements and determining a region of uncertainty, Hatch's method is essentially a two-step method, which is a way to avoid the problem of large numbers. The essence of the Knight patent is to do the opposite, plunging into a sea of possible solutions, even if there are trillions of them, and finding the single, best solution out of the entire product space of possibilities.

If ten different whole cycle values can be added to the first difference phase measurements from each of four satellites, then Knight defines $10^4$ or 10,000 possible acceptable solutions. Knight then finds the one-and-only solution out of 10,000 that matches the measured phase data better than all 9,999 other combinations. If eight satellites are available (which does happen), then Knight finds the single best solution out of $10^8$ or 100 million possibilities. If two antenna pairs are present, then the number becomes $(10^8)^2 = 10^{16}$. Thus whereas Hatch uses a two-step method of avoiding large numbers, Knight provides a practical method for finding the single best solution in a solution space with thousands or millions of possibilities. Hatch even suggests that the Knight approach is incorrect. For example, at column 8, Line 63, Hatch states: "if ten different whole cycle values can be added to the first differences from each of the four satellites, then one might expect 10³ or 10,000 possible solutions within the uncertainty region . . . Indeed, some authors have defined the number of possible acceptable solutions in exactly this fashion."

Knight describes a method that is more computationally intensive than Hatch's, and has proven to be reliable and workable in commercially-viable applications. Hatch's method avoids the problem of large numbers, and does best under conditions in which the problem of large numbers does not exist, e.g., under conditions where the myriad of possible solutions collapse into a handful. In the real world, conditions are usually not optimum, which would require the corresponding equipment that uses Hatch's method to be more complex, in order to achieve the same results as the present invention's.

Hatch's two-step method includes preliminary steps involving making carrier phase measurements, and then numbering them one through N, followed by an $(N+1)^{th}$ measurement. It could be expected that any similar apparatus will make carrier phase measurements, and the basic idea of interferometry is conventional, regardless of how the carrier phase measurements are numbered. Such preliminary steps define which carrier phase measurements are involved in generating an initial set of potential solutions, and which carrier phase measurement is defined to be the redundant measurement for eliminating potential solutions. As applied to attitude determination, the step of determining the approximate relative position of the secondary antenna equates to measuring the distance between the antennas, and noticing that the secondary antenna has to lie on a sphere centered at the main antenna.

Hatch's method involving a "plurality N of satellites" is not the same as a "plurality of satellites". As applied to attitude determination, N is exactly two. As applied to kinematic surveying, N is exactly four. Hatch makes this explicit in FIG. 7, blocks 58 and 62, and states at column 12, line 3, "The first computations to be performed in an attitude determination application are to compute the entire set of potential solutions based on the carrier phase measurements from two satellites." One of the significant features of the method described is the use of only two of the satellites to determine the set of potential solutions, rather than more than two satellites. Hatch explains that only a plurality of N=2 satellites are required " . . . in the attitude determination application, . . . [there is] only a two dimensional uncertainty region corresponding to the surface . . . Thus only two satellites are needed to define all the potential solutions that can exist on the two dimensional uncertainty region . . . The attitude detection application is a two dimensional uncertainty problem, requiring two satellites to define all of the potential solutions . . . The final broad step in the method of the invention is eliminating false potential solutions based on redundant information from additional satellites, i.e. additional to the minimum two . . . satellites required to define all of the potential solutions."

The phrases "initial set", "initial set of potential solutions" and "possible solution", refer specifically to the result obtainable by applying the first step of Hatch's two-step method. This "initial set of potential solutions" is to be generated from the received carrier signals of two and only two satellites, since the teaching is that "only two satellites are required to define all of the potential solutions."

The notion of "potential solutions" is thus restricted to 188 points, or to some such number in a similar example, but certainly not 10,000 solutions. It is also very clear that "eliminating false solutions from the initial set of potential solutions" means eliminating 187 points out of 188 points.

Hatch contends that it is not necessary to consider 10,000 possible solutions, because "the uncertainty region is two dimensional" and the measurements from any two satellites span the region of uncertainty. Using two satellites results in a collection of only 188 possibilities. Hatch contends that the correct solution is one of those 188 points, and that those 188 points are the only possibilities, that those other myriad of possibilities do not exist.

The "initial set of potential solutions" of Hatch cannot be extended to cover an entire product space of 10,000 solutions, because the essence of the two-step method is avoiding the problem of large numbers. Hatch proposes reducing the dimensionally of the solution space to the bare minimum and declares that the right answer has to lie within that reduced solution space, and that only the first measurements corresponding in number to the bare dimensionally are required to determine all the possible solutions.

Knight does not include an initial set. The method of Knight is to search for the right answer somewhere among 10,000 possibilities and finds the single best match out of such possibilities. There is no reason to stop and look at 188 possibilities when the remainder of 10,000 possibilities have to be searched. Furthermore, those 188 possibilities defined by Hatch do not resemble anything in Knight. Knight does not involve deriving from the carrier phase measurements an initial set of potential solutions for the relative position. Furthermore, Hatch generates those 188 points using a nonlinear operation on the carrier phase measurements of two satellites, something that Knight does not.

Hatch eliminates false solutions from the initial set of potential solutions, whereby the number of potential solutions is not increased by use of the redundant carrier phase measurements. Knight does not deal with Hatch's "initial set", whether to create it or eliminate from it. Most of the time, in a commercially-viable apparatus, the right solution will not be found in such an initial set.

If carrier phases could be measured perfectly, without radio reflections, reception noise, non-common antenna phase center motion, temperature sensitive drifts and other corruption of the measured phase data, then the attitude determination problem really would be two-dimensional. The right solution for position of the secondary antenna might then be found within Hatch's initial set of 188 potential solutions. Determining the right solution would be a simple matter of eliminating 187 false solutions by comparison with the third carrier phase measurement. As long as phase measurement errors are small enough, the two-step method based on near perfect measurements is satisfactory. Though there is some small perturbation in computed results, the right answer comes out in the end most of the time. Phase measurement errors of about two degrees RMS are usually tolerable.

Only one whole cycle value results in a surface that passes closer to a specific potential solution than any other whole cycle value. The problem is that phase measurements contain error, and geometric considerations amplify this error when measurements are processed in a computing apparatus. There is only one surface that passes closer to a specific potential solution than any other, but unfortunately, the surface that passes closest is often the wrong surface. Another surface farther away may be the right one. Not only can the surface be in the wrong place due to measurement error, Hatch's potential solution may be in the wrong place as well, due to error effects that are worse for the potential solution than the surface.

The supposed potential solution is actually a computational result that is often badly perturbed by phase measurement error combined with geometrical dilution of precision. A scissors effect can amplify measurement errors that distort the planes. Subsequently, the formation of intersections of lines with a sphere introduces a nonlinear operation on noisy data which greatly amplifies some of the errors. Hatch actually chooses the two satellites closest together in order to form an initial set with fewer than 188 points, whereas considerations of error sensitivity would dictate the opposite.

Hatch teaches that only one of the whole cycle values passes closer to a specific potential solution than any other. The two-step Hatch method prescribes that only the closest whole cycle value (from the additional satellite data) is selected for each of the potential solutions whereby the number of potential solutions is not increased. At some point, as phase measurement errors are increased, corresponding to less favorable operating conditions, the prescription begins picking the wrong whole cycle values a significant fraction of the time. Using Hatch's method, there is no way to pursue any option but the closest, and processing a phase measurement with the wrong whole cycle value added to it further accelerates the deterioration of computed results.

By comparison, all of the whole cycle values are tried as possibilities in the Knight method. An integer combination that looks very poor initially becomes more attractive as the solution progresses, eventually finishing as the best possible solution out of 10,000 or more. Every possible integer combination is pursued until, taken as a whole, it can be decided that the combination under development is less likely than another combination that has been completely finished and weighed with all satellite data included. The Knight method does not minimize the solution space dimensionally to the bare minimum and then restricts attention to an "initial set of solutions" obtained with only the data of the first measurements corresponding to that bare dimensionally. Most of the time, under real world conditions, the right answer simply is not to be found. The job of finding the right solution cannot be accomplished by avoiding the problem of large numbers.

Benjamin W. Remondi, reported the status of differential GPS (DGPS) accuracy and on-the-fly (OTF) kinematic GPS (KGPS) in a paper titled, "On-The-Fly Kinematic GPS Results Using Full-Wavelength Dual-Frequency Carrier Ranges".

The carrier phase ambiguity resolution problem has been the focus of a great deal of attention from research communities. In essence, the integer number of carrier cycles that existed between GPS receiver and satellite at the time that the signal was acquired must be determined. Direct range measurements, combined with the satellite geometry, allow the correct integer carrier phase ambiguities to be determined for a plurality of satellites tracked at two or more sites. Ambiguity resolution techniques that only use GPS measurements have become computationally efficient. The use of additional sensors such as a laser level, electronic distance meter, a compass, a tape, etc., provide valuable constraints that limit the number of possible integer ambiguities that need to be considered in a search for the correct set. For example see, INTEGRATED TERRESTRIAL SURVEY AND SATELLITE POSITIONING SYSTEM, filed Jul. 1, 1993, and issued as U.S. Pat. No. 5,471,218.

A method for carrier phase ambiguity resolution is described by Benjamin W. Remondi in U.S. Pat. No. 5,442,363, which was filed Aug. 4, 1994, and was issued Aug. 15, 1995. Such Patent was filed after the parent case in the present Application. The method described by Remondi was previously described in broader terms in "Kinematic GPS Results Without Static Initialization" NOAA Technical Memo NOS-55, May 1991. Such method takes advantage of the dual-frequency carrier phase data and L1 code data to obtain centimeter-level results. Such technique works best when full-cycle carrier phase data is available on L1 and L2 bands and when precise C/A-code is measured, although the claim is made that the method can work with single-frequency data too.

The code and the carrier phase are simultaneously measured at the reference and rover stations. Single-difference code and carrier phase measurements are formed between the stations and all the visible satellites. The time interval is set long enough to maximize the filtering time constant, but still short enough so that the ionospheric divergence is not too great. A reference code epoch is chosen so that the single-difference ranges can be adjusted to one another. Single-difference carrier phase is used to adjust the code ranges to the reference code epoch. An averaged code measurement is then formed from all the code observations in a time window. A best estimate rover location relative to the reference station can be determined from four or more averaged code values. Such best estimate forms the center of a search volume that is then constructed. A variety of methods are given for generating the search space. The Hatch method of using the minimum number of phase intersections to generate the search candidates is then used for L1 and L2 phase candidate locations. The L1 and L2 space points will be coincident with one another if they are correct, the incorrect candidates are culled. All this assumes that the ionospheric disturbance is not too great, and such is not a valid assumption for long baselines. The L1 and L2 space points that agree within a threshold maximum are accepted for the next stage. Triple difference processing is used to propagate the potential L1 and L2 ambiguity candidates. The L1, L2, and ionospheric-free residuals are studied, and accumulated statistics are generated. A ratio test is used to discern the two best candidates from a list. If sufficient separation cannot be achieved before a best candidate can be accepted, the process is repeated.

The prior art methods, particularly those described by Hatch, are weak when the satellite constellation geometry is poor, and positions corresponding to the L1 and L2 bands have to be computed to generate L1/L2 candidates. Remondi's use of height constraints to reduce the search space was conventional when he adopted it. The Remondi method is best suited to post-processing applications because the averaging needed for the starting point calculations can be generated from a block of stored data.

It is preferable to accumulate past data in the filter and not store in memory.

SUMMARY OF THE PRESENT INVENTION

It is therefore an object of the present invention to provide an on-the-fly real-time kinematic system.

It is a further object of the present invention to provide a remote-controlled servo system with centimeter accuracy for industrial applications.

It is another object of the present invention to provide an apparatus that provides high frequency on-the-fly real-time kinematic updates.

Briefly, a system embodiment of the present invention comprises a fixed and a roving pair of four-observable GPS receivers and a communication link between them for double differencing code and carrier measurements. For a moving RTK application, the reference station location does not have to be fixed or exactly known. In fact autonomous GPS to 100 m is acceptable, as long as the reference-to-rover baseline length is short (<5 km). Carrier phase integer ambiguities are resolved efficiently by searching the simultaneous narrow-lane intersections of both the L1 and L2 wave fronts propagated by the GPS satellites being tracked. External constraint information, such as elevation, is additionally used to speed up the resolution of integer ambiguity. Data between the reference station and the rover is communicated in compressed form at a regular time interval, e.g., once a second at each epoch, and demi-measurements of carrier phase are obtained at a more frequent rate, e.g., ten times a second, and used to propagate solutions between epochs.

An advantage of the present invention is that a system is provided that does not require reference point initialization, but rather can initialize itself on-the-fly.

Another advantage of the present invention is that a system is provided that has centimeter level position accuracies.

A further advantage of the present invention is that a system is provided that outputs real-time kinematic position solutions in local coordinate formats.

These and other objects and advantages of the present invention will no doubt become obvious to those of ordinary skill in the art after having read the following detailed description of the preferred embodiment which is illustrated in the drawing figures.

DETAILED DESCRIPTION OF THE PREFERRED EMBODIMENT

Figure 1:
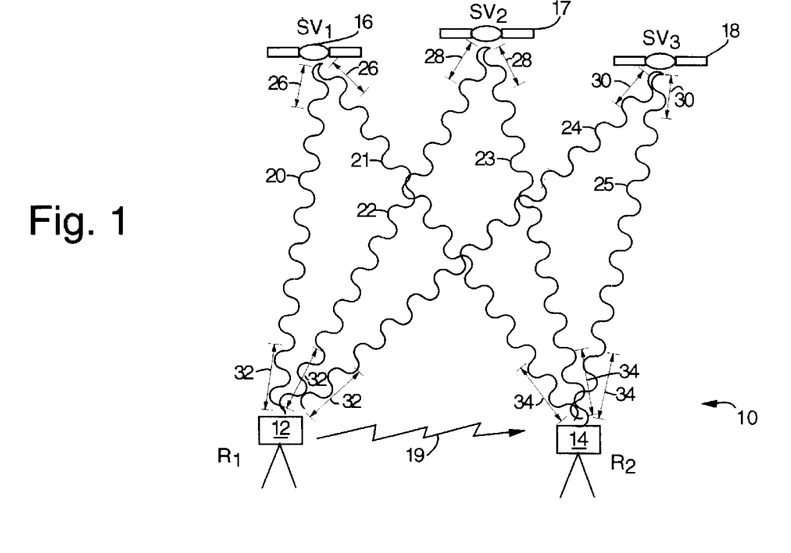
FIG. 1 is a schematic diagram of a GPS-based on-the-fly real-time kinematic system embodiment of the present invention.

FIG. 1 illustrates a on-the-fly (OTF) real-time kinematic (RTK) system embodiment of the present invention, referred to by the general reference numeral 10. System 10 comprises a reference station 12 and a rover 14. On-the-fly ambiguity resolution techniques are used to enable the acquisition of integer phase ambiguities while rover 14 is moving. Such OTF ambiguity resolution avoids the phase continuity requirement of prior art kinematic positioning systems.

A first through third satellite vehicle (SV1–SV3) 16–18 transmit pseudo random number (PRN) codes on two carrier frequencies L1 and L2 (1575.42 MHz and 1227.60 MHz) that are approximately nineteen and twenty-four centimeters in wavelength. Satellite vehicles 16–18 represent the satellite vehicles that may be accessible to reference station 12 and rover 14, e.g., the global positioning system (GPS) satellites operated by the United States Government.

Reference station 12 and rover 14 are three-observable or four-observable type GPS receivers. A three-observable GPS receiver can track L1 code, L1 carrier phase and L2 carrier phase. A four-observable GPS receiver can measure both carrier phase and code on both L1 and L2 frequencies. Reference station 12 communicates its observations to rover 14 via a data link 19. Four-observable measurements are preferred over three-observable receivers. Four-observable measurements provide a wealth of information that can be exploited during data reduction. The present invention is not limited to four-observable measurements, but also includes three-observable measurement. Dual-frequency phase combinations, such as "wide-lane" (eighty-six centimeter wavelength) and ionosphere-free observables are two such conventional phase combinations. A precision code (P-code) carried on the L2 carrier may periodically be encrypted to a secret "Y-code". When encryption is active, reference station 12 and rover 14 switch to a mode in which four observables are maintained by full-cycle L1 and L2 phase measurements, precise L1 coarse acquisition (C/A) code and cross-correlated Y-code data. The cross-correlation technique relies on the fact that both the L1 and L2 Y-codes are identical, although the Y-code itself is not necessarily known. The difference in group delay between the L1 and L2 signals is precisely determined by a cross-correlation technique. The cross-correlation observation is added to the L1 C/A-code observable to derive an L2 range measurement which is used in a variety of ways during data reduction. Enhanced cross-correlation techniques may also be employed, which rely on the knowledge that the Y-code is generated by combining the P-code with a W-code which has a chipping rate less than the P-code. Alternatively, receivers which have access to the Y-code crypto-keys, and can directly track Y-code may be used.

Since dual-frequency GPS receivers are more complex and typically more expensive than single or dual frequency receivers, and since three-observable or four-observable measurements are not strictly required in every instance, alternative embodiments of the present invention may substitute single or dual frequency, e.g., L1 code and phase or L1 and L2, measurement. Such single-frequency receivers may be used in reference station 12 and the rover 14.

In FIG. 1, each of a plurality of transmitted signals 20–25 comprise a combination of the L1 and L2 carriers. The transmission of signals 20 and 21 includes a satellite clock error that results in a ranging distance error 26. The transmission of signals 22 and 23 includes a satellite clock error that results in a ranging distance error 28. Similarly, the transmission of signals 24 and 25 includes a satellite clock error that results in a ranging distance error 30. Reference station 12 introduces a receiver clock error that results in a ranging distance error 32 common to satellite vehicles 16–18. Rover 14 also introduces a receiver clock error that results in a ranging distance error 34 that is common to satellite vehicles 16–18. Conventional double-differencing techniques are used in rover 14 to subtract out errors 26, 28, 30, 32 and 34 to yield PRN and phase measurements which have greatly reduced satellite-common and receiver-common errors.

Each signal 20–25 has an unknown number of whole-cycle carrier phase transitions between each satellite vehicle 16–18 and the reference station 12 and the rover 14. An interference pattern that results at various observation points amongst these signals 20–25 is used to identify the otherwise ambiguous signal intersections.

Figure 2:
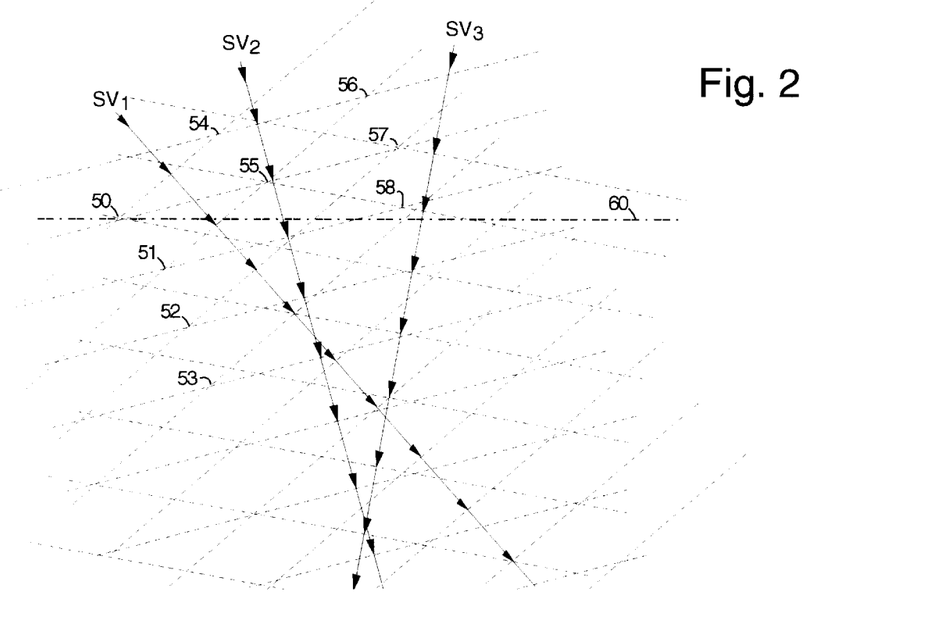
FIG. 2 is a diagram representing the whole-cycle carrier phase wave fronts of signals propagated by three GPS satellites and their resulting interference pattern and intersections.

FIG. 2 illustrates, in simplified two-dimensional form, the carrier wave fronts generated by three satellites SV1–SV3. At carrier frequency L1, each wave front is separated from the next by nineteen centimeters. PRN code measurements are too coarse to sort out which wave front is which within any one given neighborhood of wave fronts. The wave fronts are thus ambiguous and represent the well-known carrier phase integer ambiguity problem. The wave fronts from two satellite vehicles, e.g., SV1 and SV2, intersect at a number of points, represented by points 50–58. Without more, each of points 50–58 is indistinguishable from the other. Using the wave fronts from a third satellite vehicle, e.g., SV3, only the intersections represented by points 50, 55 and 57 are coincident with all three wave fronts. A fourth satellite vehicle's wave fronts could be used to resolve between even these intersections to uniquely identify the best solution to the integer ambiguity problem.

System 10 uses both L1 and L2 wave fronts simultaneously to reduce the number of visible satellite vehicles necessary to solve the integer ambiguity problem and to yield high quality results where the best solution is widely separated from the second best solution. The search through the solution tree described by the Knight method is thus shortened and simplified, making OTF operation feasible. In FIG. 2, the grid of wave fronts shown would be supplemented by a second, superimposed grid with a different separation distance between adjacent wave fronts. For L1 and L2, one such grid has the wave fronts separated by approximately nineteen centimeters and the other grid has its wave fronts separated by twenty-four centimeters. This provides a larger number of wave front intersections, but reduces the number of intersection points that are coincident for all the visible satellite vehicles. The search for the unique solution is thus simplified because the number of potential candidates is reduced.

System 10 also provides integer ambiguity solutions based on externally provided constraints, e.g., altitude. For example, given that FIG. 2 is drawn in the vertical plane with respect to the earth, an altitude 60 when used as a constraint, can be used to select point 50 from the field of points 50, 55 and 57 as a unique solution to the integer ambiguity problem. Such constraints are useful in reducing the computational burden created by the search problem, and using constraints is particularly more effective when a more limited number of satellite vehicles are visible than is ordinarily the case.

The constraints can be exercised in the search algorithm. As the branches of the integer ambiguity search tree are traversed, an additional test is used to determine if the current search candidate is compatible with such external constraint. Because a three-dimensional position is associated with each search candidate, the branch pruning can be relatively straightforward. The ambiguity candidate is acceptable only if its location in space is within a confidence region bound set when using the external constraint. Any sensor that can provide x, y, or z position information that is better than that obtainable from GPS code phase is a candidate source of external constraints. For example, the horizontal plane of a leveled laser-plane surveyor's instrument can provide a high-confidence height constraint. The pivot point of a cabin for a large earthmoving machine could be determined by resection of three or more position fixes for a point that swings about the pivot on a constant radius. The swing point and swing arc radius could further be used to constrain search candidate locations if initialization was subsequently lost.

Real-time kinematic positioning provides for the precise estimation of the location of a stationary or moving rover relative to a reference site. A reference site is established at a point whose location need not exactly be known relative to the satellite coordinate datum. A reference satellite receiver collects carrier phase, code measurements and data to the satellites at a regular interval, e.g., once every second or epoch. Time-tagged measurements and additional information is transmitted to one or more roving units via a modem/radio or telephone etc. At a rover unit, the reference station data is merged with locally collected satellite measurements at the lowest common measurement update rate (e.g., every second). There is a finite delay in the position solution that is computed from the raw reference and rover stations. The solution delay is a function of the radio/modem bandwidth, any delays in the reference station measurement system and the rover station measurement and position update systems.

The solution latency has minimal impact for a static situation where the reference and rover are stationary. However, when the rover is attempting to navigate while moving, the solution latency causes the displayed position to lag the actual location of the user.

In addition to the solution latency, the measurement update rate used in a system governs how often the user position will be updated. For high precise/dynamic applications, a fast update rate of ten to fifty Hertz is desirable. The bandwidth of the datalink between the reference and rover sites places a limit on the measurement update rate of the system. Even with a data compression algorithm, a maximum update rate is reached.

Figure 3:
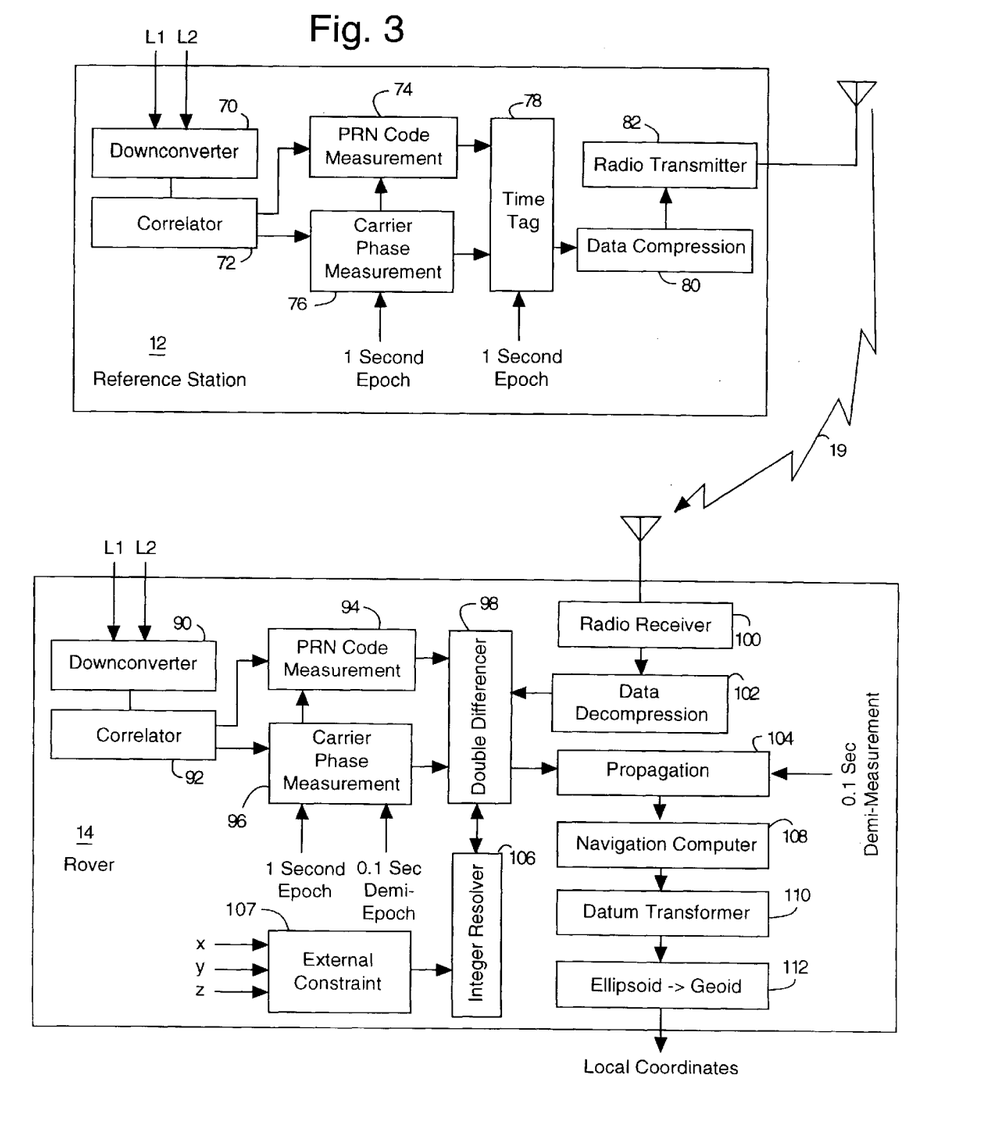
FIG. 3 is a block diagram of the reference station and rover of FIG. 1.

FIG. 3 illustrates the construction of reference station 12 and rover 14. Reference station 12 inputs the signals 20, 22 and 24 (both L1 and L2) into a downconverter 70. A correlator 72 extracts information from an intermediate frequency signal produced by the downconverter 70 and feeds such carrier and code information out to a PRN code measurement unit 74 and a carrier phase measurement unit 76. The epoch, which occurs at one second intervals, is used to trigger the four-observable measurements related to signals represented by signals 20, 22 and 24, and to time tag such measurements in a time tag unit 78. Time-tagged data is then fed to a data compression unit 80 for radio transmission out by a transmitter 82. The compression of data and obtaining of measurements at each one second epoch keep the volume of data required to be carried by the data link 19 to rover 14 to a reasonable level. For example, a 2400 baud channel can be used to carry the information obtained by the reference station 12.

The rover 14 receives signals represented by signals 21, 23 and 25 and produces an intermediate frequency composite from them in a downconverter 90. A correlator 92 extracts information from the intermediate frequency that is supplied to a PRN code measurement unit 94 and a carrier phase measurement 96. Four observables for each signal 21, 23 and 25 are provided to a double differencing unit 98 at the one second epoch rate. A radio receiver (or datalink subsystem) 100 receives the data from the reference station 12 over data link 19 and a data decompression unit 102 extracts the original time-tagged data. Double differencing unit 98 combines the measurements taken at both the reference station 12 and the rover 14 to eliminate clock errors 26, 28, 30 32 and 34 (FIG. 1). Unbiased measurements are then made available to a propagation unit 104 at a demi-measurement rate of ten per second.

Once a pair of main measurement epochs has been obtained, as identified by their respective time tags, a demi-measurement propagation process can begin. All of the demi-epochs in the rover 14 are used to propagate forward a last main measurement update obtained at an epoch. Demi-measurement updates are more frequent than the main measurement updates and therefore closely track the current rover position. In this way, the demi-measurement propagation reduces solution latency and also gives the user a more continuous location estimate.

Demi-measurement propagation introduces some small errors into the user position. GPS has an intentional dither on the civilian signals. Dithering is typically on the order of one centimeter per second squared. As long as the main epoch updates are obtained every second, and the main epoch solution latency is less than one second, the demi-measurement propagation errors should be less than 0.5×1.0 cm/s$^2$, times the current dilution of precision (DOP). Under normal conditions, errors of two centimeters or less would be experienced.

FIG. 3 further illustrates an integer resolution unit 106 that uses the four observables of L1 and L2 code and phase from the visible satellite vehicles 16–18 to quickly determine a unique solution to the integer ambiguity problem. A height constraint unit 107 connected to the integer resolution unit 106 reduces the search space of ambiguous carrier phase integers by introducing at least one of an elevation, separation, distance and orientation constraint. A navigation computer 108 is used to solve the position of rover 14 to within a few centimeters on-the-fly ten times a second. A datum transformer 110 is used to convert from other formats, such as WGS-84, to a local coordinate format, e.g., northern-east-elevation (NEE) format so that the precise measurements obtained will conform to the datums used in local topographic maps, for example. An ellipsoid-to-geoid converter 112 corrects for variations in the geoid-spheroid separation that might exist in the geographical area of use.

Figure 4:
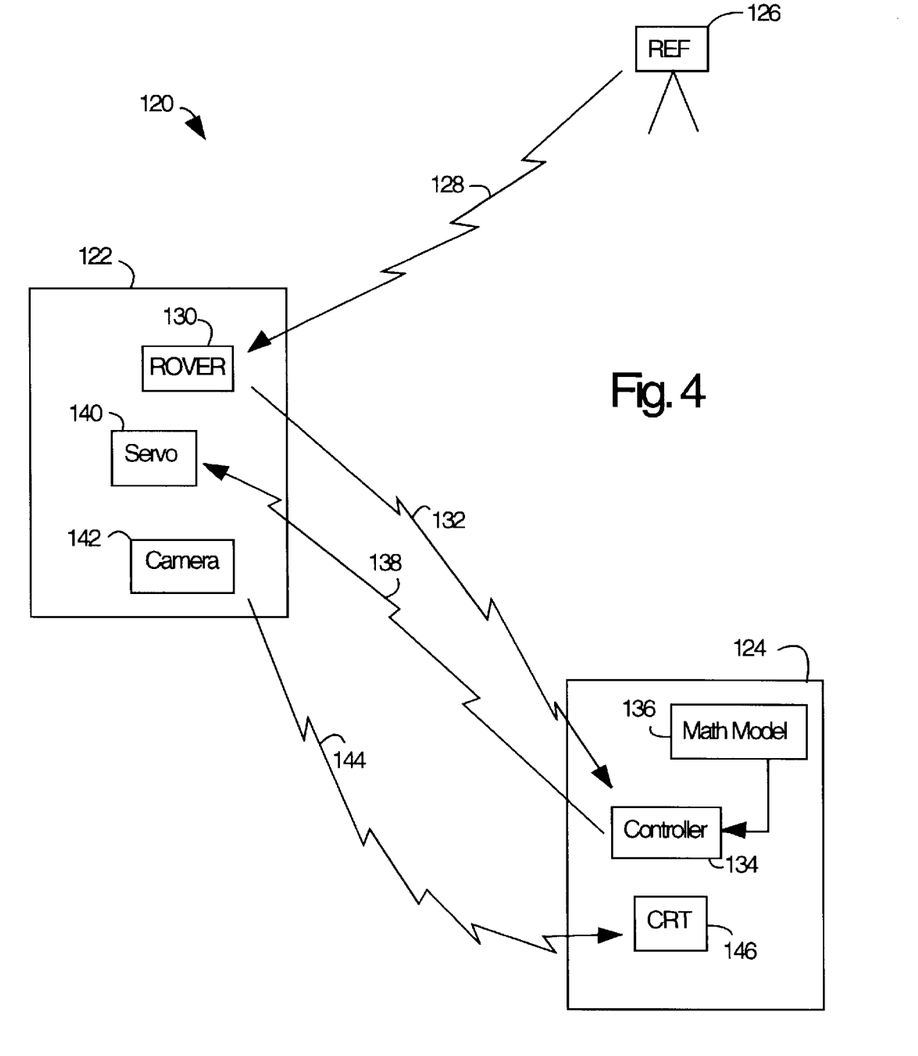
FIG. 4 is a block diagram of a vehicle remote control system embodiment of the present invention.

FIG. 4 illustrates a remote vehicle control system 120 which comprises a remote controlled vehicle 122, a remote control unit 124 and a reference station 126. A radio link 128 provides GPS signal measurement data to a rover 130. Reference station 126, radio link 128 and rover 130 are similar in construction and function to reference station 12, data link 19 and rover 14 illustrated in FIGS. 1 and 3. OTF-RTK local coordinate data is communicated near continuously over a radio link 132 to a controller 134. A mathematical model 136 provides guidance plan information for vehicle 122. For example, such information may be the flight path for a plane when vehicle 122 is an airplane, or the information may be the model extracted from a topographic survey of a coal seam in the earth when the vehicle 122 is an open-pit coal excavator. The controller 134 compares the math model information to the position information and issues a servo control signal 138 to a servo unit 140. Such control may be automatic, and include proportional plus integral plus differential (PID) control. A camera 142 provides a video representation of the area surrounding vehicle 122 over a radio link 144 to a monitor (CRT) 146.

The remote vehicle control system 120 may be incorporated into an earth moving and grading system, e.g., as described by Clegg, in U.S. Pat. No. 4,807,131, and incorporated herein by reference. Essentially, the laser equipment disclosed by Clegg is replaced by the elements of system 10, illustrated in FIG. 1 of the present specification. Such a configuration allows robotic control at the rover unit which can adjust a mechanism according to a comparison between GPS position determinations and a predetermined construction model. Such construction models include placements for bridge pilings, coal seam excavation in open-pit mines, and unmanned vehicles.

Figure 5:
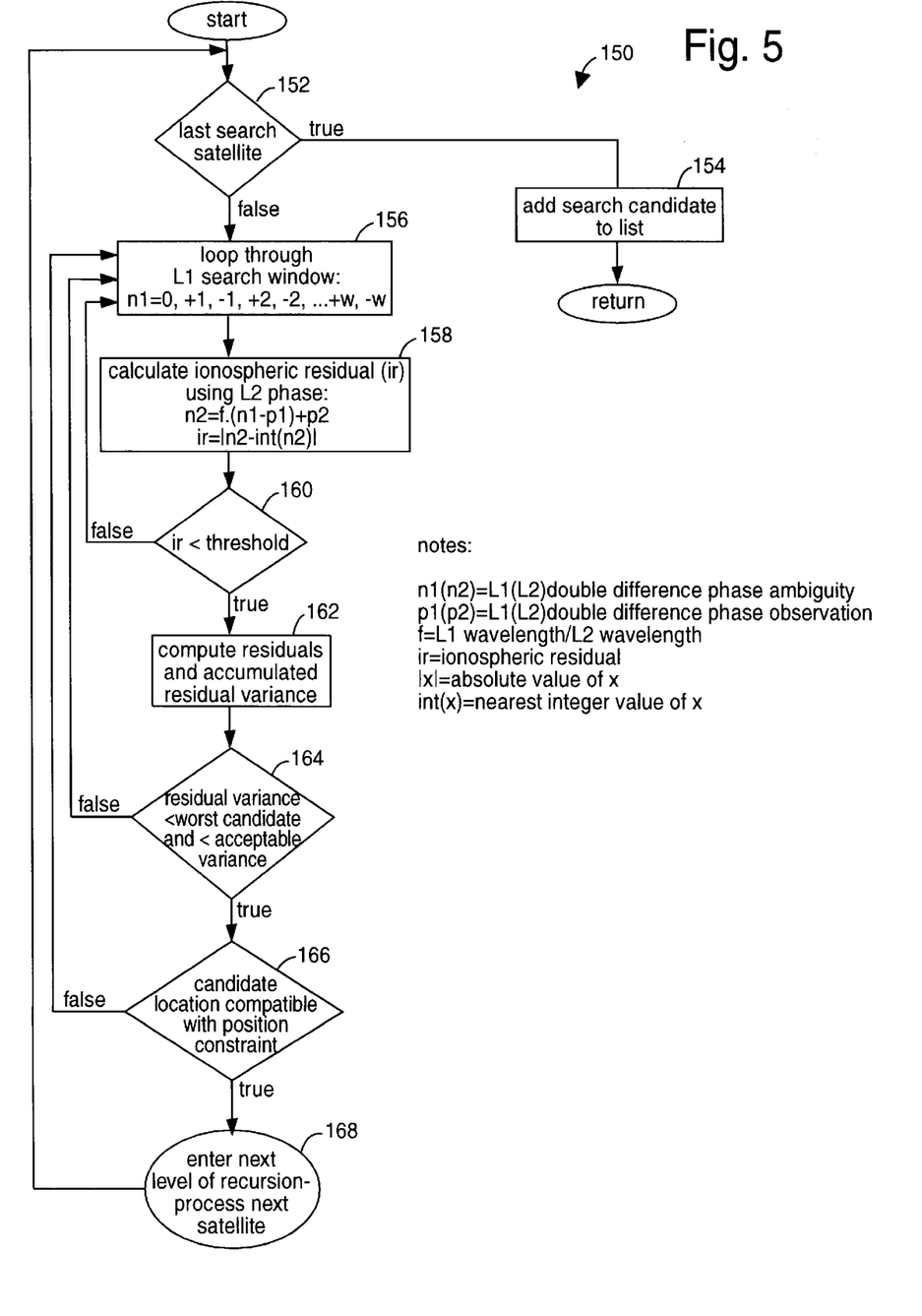
FIG. 5 is a flowchart of an ambiguity search method embodiment of the present invention.
Figure 6:
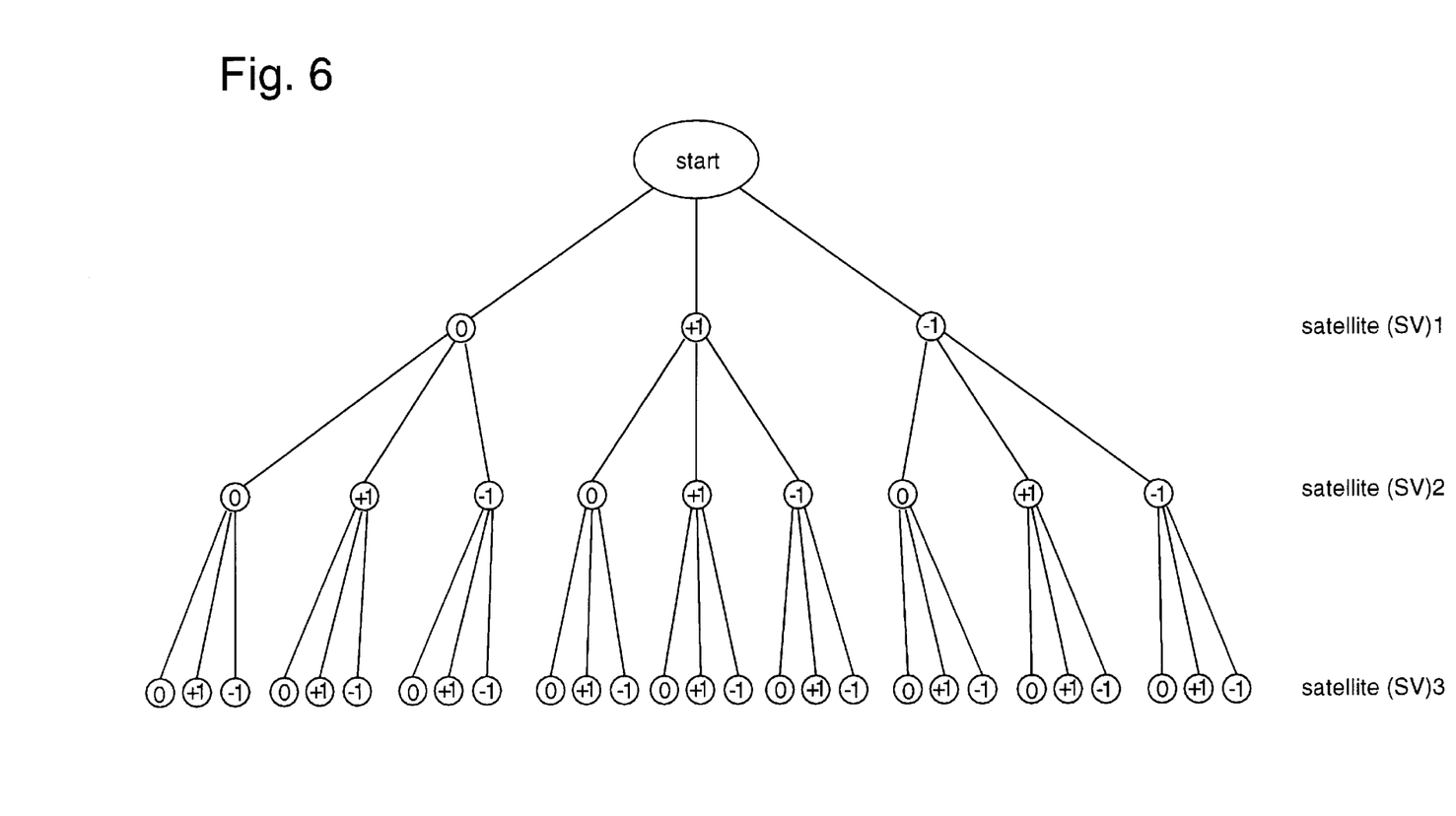
FIG. 6 is diagram of a search tree used as an example to explain the method of FIG. 5.

FIG. 5 represents a recursive method embodiment of the present invention for building a search tree and a short-list of the best phase-ambiguity candidates, and is referred to herein by the general reference numeral 150. FIG. 6 represents a search tree of L1 ambiguities and a companion search table with an ordered list of the pruned candidates is provided in Table I.

TABLE I

| SV1 | SV2 | SV3 | Residual Variance |
|-----|-----|-----|-------------------|
| 0   | 0   | 0   | 0.005             |
| 0   | 0   | −1  | 0.015             |
| −1  | 0   | +1  | 0.065             |
| −1  | +1  | +1  | 0.085             |

The method 150 includes a step 152 that tests to see if the last search satellite has been handled. If so, a step 154 adds the search candidate that was developed to a list of candidates and a return is made to the calling program. Otherwise, a step 156 implements a loop through the L1 search window. A step 158 calculates the ionospheric residuals using the L2 phase. A step 160 checks to see if the ionospheric residual is less than a threshold value, if not, control loops back to step 156. Otherwise, a step 162 computes the residuals and accumulates the residual variance. A step 164 checks to see if the worst candidate is greater than the residual variance but less than the acceptable variance, if not control loops back to step 156. Otherwise, a step 166 checks to see if the candidate location is compatible with the position constraint, if not the control loops back to step 156. Otherwise, a step 168 causes the next level of recursion to be entered to process the next satellite and then control passes back up to step 152.

The initial estimates of the L1 carrier phase ambiguities are derived with a least squares estimation using carrier phase and pseudorange observations. A test is made prior to calling the search function (method 150), to see if at least four double difference ambiguities from five satellites have converged to a suitable level. Such convergence is typically achieved with one minutes worth of data collected every second.

For purposes of describing the method, it can be assumed that only three satellites are needed to generate the ambiguity search candidates. A recursive search, e.g., the method 150, is used to build the search tree, e.g., FIG. 6, by looping through a search window of potential integer L1 ambiguity candidates, as represented by step 156. The search window is constructed about the real-valued ambiguity estimates obtained from a least squares estimation. For example, a search window of 0, +1, and −1 is used in FIG. 6, but a much larger window would be used in actual practice. The L1 ambiguity is evaluated by computing the ionospheric residual from the L2 carrier phase, but such step 160 is not essential to the present invention to build the search list. However, such step 160 is preferably included because it enhances the discrimination and pruning of poor ambiguity candidates. The ionospheric residual will be very near zero for baseline lengths under ten kilometers. FIG. 2 shows a grid of L1 waveforms that is effectively overlaid by another grid of L2 wavefronts by a step 160 in FIG. 5. This permits discriminating many more invalid ambiguity candidates than could be done with L1 wavefronts and geometry alone. In step 162, the location of the L1 waveforms in space can be constructed and an accumulated tally is made of the measurement residuals and the residual variance. In step 164 the search candidate variance is compared with an acceptable value derived from empirical experimentation. If the candidate variance exceeds an acceptable threshold, then another L1 ambiguity candidate is considered in the loop. Once entries are made in the search table, e.g., Table I, it is possible to also test the search candidate variance to see if it exceeds the worst value in the search table. Thus branches of the search tree can be pruned before sub-branches are ever considered. Such pruning reduces the computational loading.

When position constraint information is available, e.g., the external constraint 107 (FIG. 3), the search candidate location can be tested to see if it is compatible, as in step 166. If steps 160, 164 and 166 all provide true results, then a deeper level of recursion is entered to enable processing of the next search satellite, as in step 168. In FIG. 6, satellite SV1 is processed first and L1 ambiguity "0" is found to be acceptable. In the next level of recursion, SV2 is considered and L1 ambiguity "0" is also accepted. At the final level of recursion, the L1 ambiguity value is "0".

The step 152 tests to see if all the satellite ambiguities have been considered. If so, the ambiguity candidate is inserted into the search table. In the example, Table I, the first search entry in the search table will be 0, 0, 0 with the residual variance of 0.005. The next search table entry corresponds to 0, 0, −1, and so on. The search table candidate with the smallest residual variance is deemed the best one and subsequent epochs of data are used to process the search candidates. The incorrect candidates will diverge, e.g., the residual variance will rapidly increase, while the correct candidate will converge.

Although the present invention has been described in terms of the presently preferred embodiment, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A recursive method for building a search tree and a short-list of the best phase-ambiguity candidates for a real-time kinematic satellite navigation receiver, the method comprising:

implementing a program loop through an L1 carrier phase search window;

calculating a set of ionospheric residuals using an L2 phase measurement;

checking if an ionospheric residual is less than a threshold value;

computing a set of checked ionospheric residuals and accumulating a residual variance;

checking if a worst candidate is greater than said residual variance but less than an acceptable variance;

checking if a candidate location is compatible with a position restraint provided by an external constraint input; and entering a next level of recursion to process a next satellite.

2. The method of claim 1, further comprising the step of:

deriving any initial estimates of L1 carrier phase ambiguities with a least squares estimation using carrier phase and pseudorange observations.

3. The method of claim 1, further comprising the step of:

testing if at least four double difference ambiguities from five satellites have converged to a predefined level.

4. The method of claim 1, further comprising the step of:

constructing said search window about a set of real-valued ambiguity estimates obtained from a least squares estimation; and evaluating an L1 ambiguity by computing the ionospheric residual from an L2 carrier phase.

5. The method of claim 1, further comprising the step of:

locating a set of L1 waveforms in space and accumulating a tally of measurement residuals and residual variance.

6. The method of claim 1, further comprising the step of:

comparing a search candidate variance with an acceptable value derived from empirical experimentation, wherein if said candidate variance exceeds an acceptable threshold, then another L1 ambiguity candidate is considered in a recursive program loop.

7. The method of claim 1, further comprising the step of:

after making a set of entries in said search tree, testing a search candidate variance to see if it exceeds the worst value in said search table, wherein branches of said search tree are pruned before sub-branches are ever considered, and wherein computational loading is reduced.

8. The method of claim 1, further comprising the step of:

using position constraint information to test a three-dimensional location of a current search candidate location to see if it is compatible before proceeding to a deeper level of recursion to enable processing of a next search satellite.

9. The method of claim 1, further comprising the step of:

testing if all the available satellite ambiguities have been considered, and if so, a current ambiguity candidate is inserted into said search tree, and wherein any incorrect candidates will diverge as indicated by a rapid increase in the residual variance, and a correct candidate will converge.

10. A method for initializing a real-time kinematic (RTK) system for use with the global positioning system (GPS), the method comprising:

using a reference station including a GPS satellite navigation receiver and measurement means to obtain single or dual carrier frequency code and phase measurements from a relative location;

using a rover unit including a GPS satellite navigation receiver and measurement means to obtain single or dual carrier frequency code and phase measurements from a movable vehicle and outputting resulting position determinations;

double-differencing a combined set of four observables taken at both the reference station and the rover from each signal from a satellite to eliminate satellite-common and receiver-common clock errors;

pruning candidates from a search tree according to an externally provided position constraint that defines at least one of x, y, and z positions in space; and resolving any carrier-phase integer ambiguities left from the step of pruning candidates with an integer search means for searching carrier frequency phase and code measurements, wherein a unique solution for whole-cycle carrier phase ambiguity is provided to a positioning determining means with centimeter-level accuracy and on-the-fly initialization.

11. The method of claim 10, further comprising the step of:

robotic control means connected to the rover unit for adjusting a mechanism according to a comparison between said position determinations and a predetermined construction model.

* * * * *